(12) United States Patent
Emamjomeh et al.

(10) Patent No.: US 10,576,685 B2
(45) Date of Patent: Mar. 3, 2020

(54) THREE-DIMENSIONAL (3D) PRINTING

(71) Applicant: Hewlett-Packard Development Company, L.P., Houston, TX (US)

(72) Inventors: Ali Emamjomeh, San Diego, CA (US); Keshava A. Prasad, San Marcos, CA (US); Alexey S. Kabalnov, San Diego, CA (US); Yi Feng, San Diego, CA (US); Winthrop Childers, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 260 days.

(21) Appl. No.: 15/546,567

(22) PCT Filed: Apr. 30, 2015

(86) PCT No.: PCT/US2015/028519
§ 371 (c)(1),
(2) Date: Jul. 26, 2017

(87) PCT Pub. No.: WO2016/175832
PCT Pub. Date: Nov. 3, 2016

(65) Prior Publication Data
US 2018/0022025 A1    Jan. 25, 2018

(51) Int. Cl.
*B29C 64/20* (2017.01)
*B33Y 10/00* (2015.01)
(Continued)

(52) U.S. Cl.
CPC ............ *B29C 64/165* (2017.08); *B22F 3/008* (2013.01); *B22F 3/1039* (2013.01); *B29C 64/20* (2017.08);
(Continued)

(58) Field of Classification Search
CPC ..... B29C 64/165; B29C 64/393; B29C 64/20; B33Y 30/00; B33Y 10/00; B22F 3/1039; B22F 3/008
See application file for complete search history.

(56) References Cited

U.S. PATENT DOCUMENTS 6,713,125 B1   3/2004   Sherwood et al.
6,742,456 B1   6/2004   Kasperchik et al.
(Continued)

FOREIGN PATENT DOCUMENTS

EP           0764487      3/1997
EP           1415792      6/2004
WO       WO-2004/028787   4/2004

OTHER PUBLICATIONS

International Search Report and Written Opinion for International Application No. PCT/US2015/028519 dated Jan. 25, 2016, 12 pages.

*Primary Examiner* — Nahida Sultana
(74) *Attorney, Agent, or Firm* — Dierker & Kavanaugh PC (57) ABSTRACT

A three-dimensional (3D) printing method includes applying a build material, including: a plurality of first reactive particles; a plurality of second reactive particles, the first and second reactive particles to react with each other upon contact there with; and a coating on i) the plurality of first reactive particles; or ii) the plurality of second reactive particles; or iii) both i) and ii). The coating is to isolate the plurality of first reactive from the plurality of second reactive particles. A fluid is selectively applied on a portion of the build material, the fluid disrupting the coating on the portion of the build material to render the first and second reactive particles in the portion of the build material in contact with each other. The contact initiates mutual reacting and fusing between the first and second reactive particles.

15 Claims, 5 Drawing Sheets

(51) Int. Cl.
  *B33Y 30/00* (2015.01)
  *B29C 64/165* (2017.01)
  *B22F 3/10* (2006.01)
  *B22F 3/00* (2006.01)
  *B29C 64/393* (2017.01)

(52) U.S. Cl.
  CPC ............ *B29C 64/393* (2017.08); *B33Y 10/00* (2014.12); *B33Y 30/00* (2014.12)

(56) References Cited

U.S. PATENT DOCUMENTS

| | | |
|---|---|---|
| 6,966,960 B2 | 11/2005 | Boyd et al. |
| 7,431,987 B2 | 10/2008 | Pfeifer et al. |
| 7,550,518 B2 | 6/2009 | Bredt et al. |
| 7,578,958 B2 | 8/2009 | Patel et al. |
| 7,767,132 B2 | 8/2010 | Patel et al. |
| 7,795,349 B2 | 9/2010 | Bredt et al. |
| 8,715,832 B2 | 5/2014 | Ederer et al. |
| 2004/0139820 A1* | 7/2004 | Kodas .................. B01J 2/003 75/252 |
| 2006/0208388 A1* | 9/2006 | Bredt .................. B33Y 70/00 264/123 |
| 2008/0032083 A1 | 2/2008 | Serdy et al. |
| 2008/0237933 A1* | 10/2008 | Hochsmann .......... B33Y 10/00 264/463 |
| 2011/0076438 A1 | 3/2011 | Farr et al. |
| 2013/0171434 A1 | 7/2013 | Hirth et al. |
| 2013/0220570 A1 | 8/2013 | Sears et al. |
| 2016/0318250 A1* | 11/2016 | Moussa ................ B33Y 10/00 |
| 2017/0028461 A1* | 2/2017 | Fujiwara .............. B28B 1/001 |
| 2017/0072471 A1* | 3/2017 | Welch .................. B22F 1/02 |
| 2018/0104793 A1* | 4/2018 | Franke ................. B24D 5/02 |
| 2018/0354191 A1* | 12/2018 | Nauka ................ B29C 35/0805 |
| 2019/0055699 A1* | 2/2019 | Flitsch ................. H04W 4/40 |

\* cited by examiner

THREE-DIMENSIONAL (3D) PRINTING

BACKGROUND

Three-dimensional (3D) printing may be an additive printing process used to make three-dimensional solid objects from a digital model. 3D printing is often used in rapid product prototyping, mold generation, and mold master generation. Some 3D printing techniques are considered additive processes because they involve the combined application of successive layers of material. This is unlike traditional machining processes, which often rely upon the removal of material to create the final object. Materials used in 3D printing often require curing or fusing, which for some materials may be accomplished using heat-assisted extrusion or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of a three-dimensional (3D) printing method and system disclosed herein are based on a 3D fabrication process that involves the use of a mutually reactive but stable (prior to use) particulate mixture build material. The particulate mixture build material includes mutually reactive particles (i.e., particle cores), where at least one of the mutually reactive particle cores has a coating thereon. The coating allows the mutually reactive particle cores to be stably stored and dispensed in a mixed/intermingled state without reacting and fusing together. As such, the particulate mixture build material is stable, in that it remains an un-agglomerated particle mixture of unconnected particles until a fluid is applied. The particulate mixture build material fuses during use (without the application of electromagnetic radiation or heat) upon application of the fluid (e.g., an inkjet applied fluid) that disrupts the coating. The disruption of the coating allows the mutually reactive particles to come into contact with each other. The contact between the mutually reactive particle cores causes the particle cores to react and fuse, coalesce, agglomerate, or otherwise form a 3D physical network structure. The 3D physical network structure may be a bonded network or a body of connections between the mutually reacted particle cores. As such, during this 3D fabrication process, the build material reactive particles react, fuse and harden to become a layer of the 3D object in a selected region (which comes into contact with the fluid) of the build material.

Previous methods for selectively fusing portions of particle layers to form solid 3D articles generally include repeating a sequence such as (1) dispensing a powder layer; and then (2) selectively directing heat energy to a portion of the powder layer that is to be part of the 3D article. The heat energy may be applied through a laser (i.e., SLS) or by depositing an absorber and applying "blanket radiation." In some instances, it may be difficult (e.g., due to thermal diffusion) to define a fine boundary between the fused and unfused particles, which itself defines an outer surface of the 3D article. Thermally induced warpage may also cause difficulties in the previous methods.

In contrast, examples of the method and system disclosed herein allow production of 3D articles from mutually reactive particles without a need for applied heat to melt or sinter the particles. This may enable lower cost hardware solutions, as well as more precise dimensional control due to reduced thermal stress.

Figure 1:
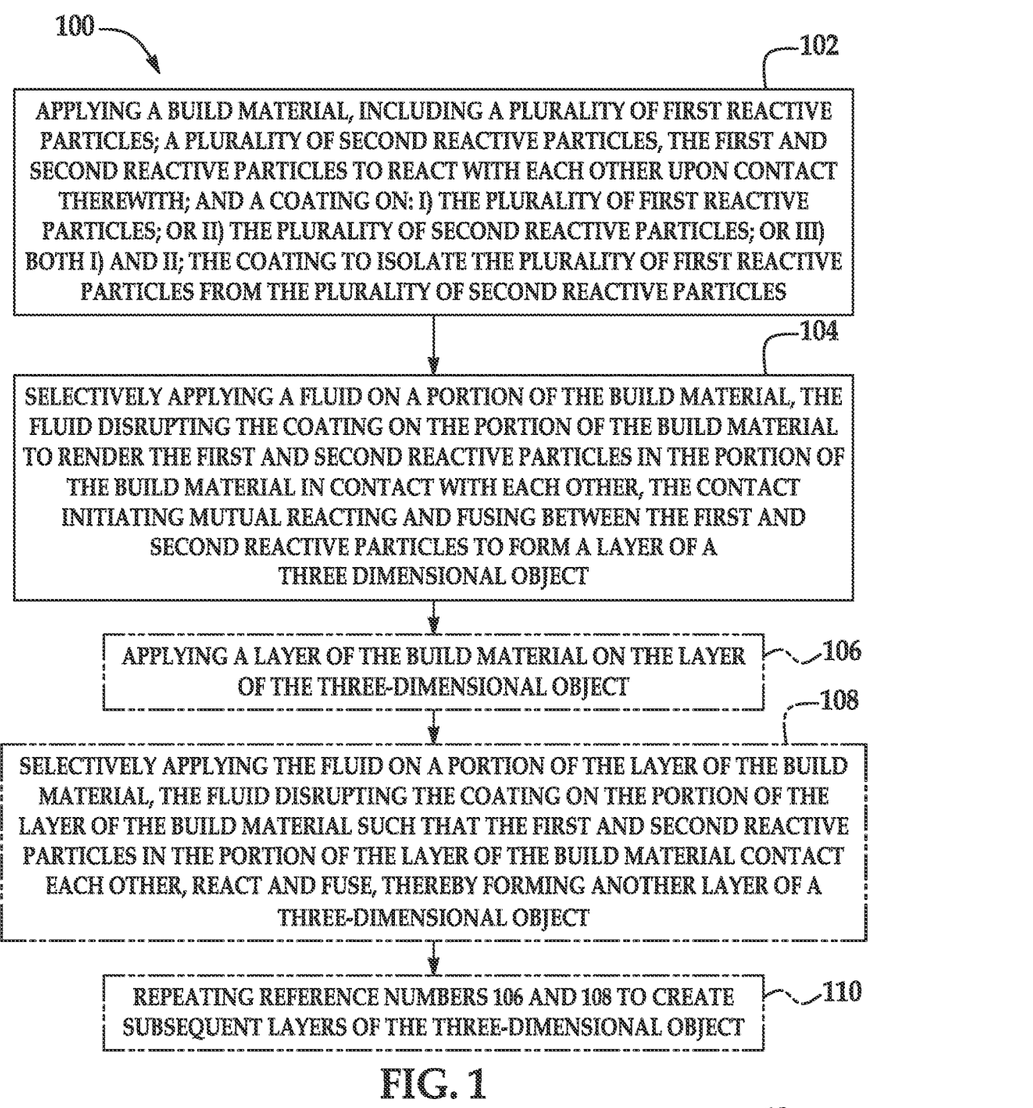
FIG. 1 is a flow diagram illustrating an example of a 3D printing method disclosed herein.

An example of the 3D printing method 100 is depicted in FIG. 1, and an example of the printing system 10 used throughout the method 100 is shown in FIGS. 4A through 4D. It is to be understood that the method 100 shown in FIG. 1 will be discussed in detail herein, and in some instances, FIGS. 2 and 3, and 4A through 4D will be discussed in conjunction with FIG. 1.

Figure 4A:
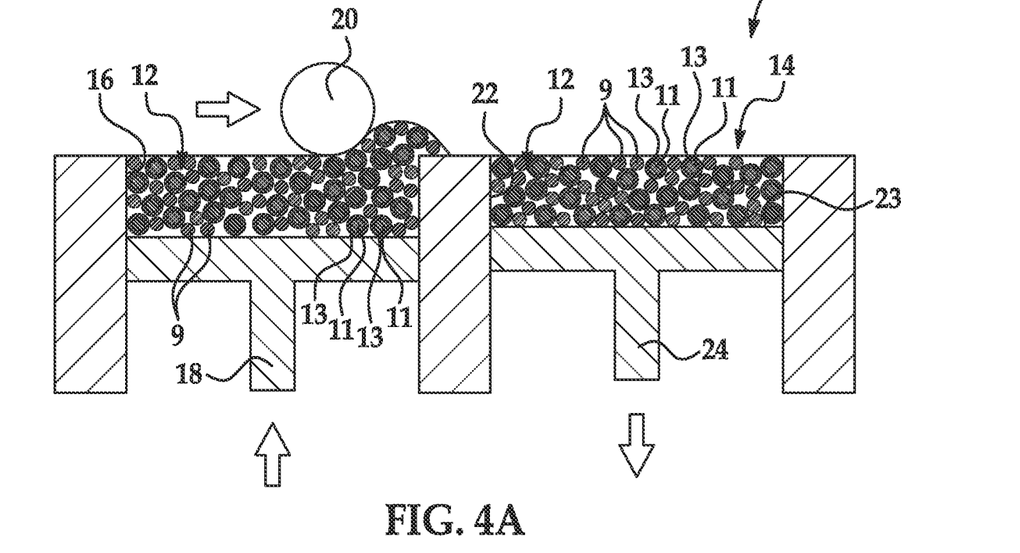
FIGS. 4A through 4C are semi-schematic, cross-sectional views of the steps involved in forming one layer of a 3D object using an example of the 3D printing method and system disclosed herein.

As shown in FIG. 1 (at reference number 102) and in FIG. 4A, an example of the method 100 includes applying a build material 12 using the 3D printing system 10. In the example shown in FIG. 4A, one layer 14 of the build material 12 has been applied, as will be discussed in more detail below.

Figure 2:
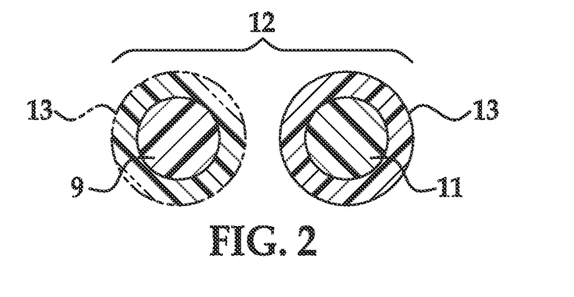
FIG. 2 is a semi-schematic cross-sectional view of examples of the build material used to form layer(s) of a 3D object.
Figure 3:
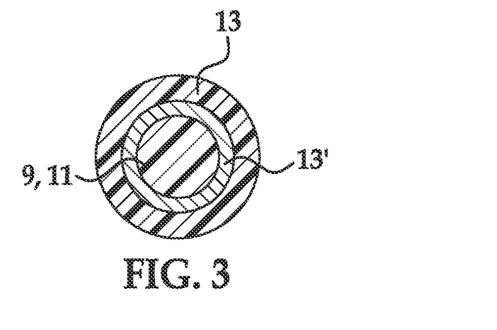
FIG. 3 is a semi-schematic cross-sectional view of an example of a build material particle with a multi-layer coating.

Different examples of the build material 12 (including mutually reactive particles isolated from each other, as described further herein) are shown in FIGS. 2 and 3. It is to be understood that any example of the build material 12 may be used in the method 100 and the system 10 disclosed herein. Examples of the build material 12 include mutually reactive particles, for example, a first reactive particle 9 (i.e., first reactive particle core 9) and a second reactive particle 11 (i.e., second reactive particle core 11). It is to be understood that the build material 12 will generally include a plurality of the first reactive particles 9 and a plurality of the second reactive particles 11. The mutually reactive particles 9, 11 are isolated from each other (by coating 13, to prevent reaction therebetween until desired) such that the build material 12 is stable (non-reactive, un-agglomerated particle mixture) prior to use. It is to be understood that the mutually reactive particle cores 9, 11, without the coating 13 and in contact with one another, react and fuse without the presence of the applied fluid. In an example, the mutually reactive particle cores 9, 11 (i.e., first reactive particles and second reactive particles) are insoluble in the fluid that is ultimately applied to disrupt the coating 13. In this example, the coating 13 is soluble in the fluid, but the particle cores 9, 11 are not soluble in the fluid.

It is to be further understood that there may be three or more types of reactive particles (i.e., the present disclosure is not limited to two reactive particles 9, 11) isolated from each other (by coating 13 to prevent reaction therebetween until desired) such that the build material 12 is stable (non-reactive) prior to use.

FIG. 2 depicts an example of the build material 12 with first reactive particle/particle core 9 and second reactive particle/particle core 11. Second reactive particle 11 is shown surrounded by/encapsulated within the coating 13. This reactive core (e.g., 11)/inert shell (e.g., 13) configuration isolates reactive particle 11 from reactive particle 9, and prevents reaction therewith. The shell/coating 13 is non-reactive/inert. "Non-reactive" or "inert" as used herein means that the coatings 13 do not react with each other (in a manner that would change the chemical/physical properties of the coating or remove the coating) and also do not react with the reactive cores 9, 11. Rather, the coatings 13 are selectively dissolvable/disruptable upon application of an appropriate fluid so as to be removable from the cores 9, 11 when desired. Reactive particle 9 may also include a coating therearound if desired (as represented by coating 13, shown in phantom).

As such, examples of the build material 12 include any of the following, or any combination thereof such that reactive particle 9 and reactive particle 11 are isolated from each other: i) reactive particle 9 with coating 13, and reactive particle 11 with coating 13; ii) reactive particle 9 with coating 13, and reactive particle 11 with no coating; and iii) reactive particle 9 with no coating, and reactive particle 11 with coating 13.

Coating 13 is relatively thin. The coating 13 may be thick enough to be robust to storage and transportations stresses, but thin enough to not interfere with core particle 9, 11 reaction once dissolved in or disrupted by the applied fluid. The thickness also may also be affected by the kinetics of dissolution. The coating 13 may have a thickness ranging from about 5% to about 10% of the diameter or size of the mutually reactive particle core 9 and/or 11 upon which the coating 13 is applied. As an example, the coating 13 has a thickness ranging from about 1 μm to about 10 μm. The thickness of the coating 13 may be adjusted by adjusting the coating 13 to reactive particle 9, 11 ratio.

FIG. 3 depicts another example of the core/shell configuration. Either of particle 9 and/or particle 11 may be coated with a first/inner non-reactive coating 13' (intermediate the core 9, 11 and the outer coating 13), and then with a second/outer non-reactive coating 13. In an example, coating 13' may be thinner than coating 13. In an example, together the coatings 13, 13' may have a thickness ranging from about 5% to about 10% of the diameter or size of the mutually reactive particle core 9 and/or 11 upon which the coatings 13, 13' are applied. As examples, each of the coatings 13, 13' has a thickness ranging from about 0.5 μm to about 10 μm. A multi-layer coating 13, 13' may be used, for example, when an outer coating 13 is used that may potentially react with reactive core 9, 11. In this example, a non-reactive inner coating 13' prevents outer coating 13 from contacting reactive core 9, 11.

Some examples of suitable mutually reactive particles 9, 11 and coatings 13, 13' are described below. In any of the examples below, the fluid and outer coating material set: (1) dissolves/disrupts the coating 13, 13' very quickly (i.e., at least half the layer build time); (2) allows for rapid drying of the fluid after dissolution of the coating 13, 13', (3) withstands powder bed temperatures prior to fluid application; and (4) is compatible with the reactive center materials (i.e., the coating 13 does not react with the cores 9, 11 and the cores 9, 11 are insoluble in the fluid). As an example of dissolving/disrupting the coating 13, 13' very quickly, the layer cycle time may be about 10 seconds, and thus the dissolution or disruption of the coating 13, as well as the reaction time between the mutually reactive particle cores 9, 11, are to be fast enough (e.g., <5 seconds) to provide a solid or green part in time for the next layer to be processed.

In any of the examples disclosed herein, the fluid is selected so that the fluid itself does not initiate the reaction between the mutually reactive particles cores 9, 11. Rather, the fluid dissolves or otherwise disrupts the coating 13, and the removal of the coating 13 enables the mutually reactive particle cores 9, 11 to come into contact with each other. The contact of the particle cores 9, 11 initiates the reaction that causes fusing.

The fluid may include an additive, such as a catalyst. The catalyst may accelerate the reaction between the particle cores 9, 11 and/or may enable different mechanical properties throughout the formed part (thus enabling digital manipulation/modulation of properties of the part). In these instances, however, it is to be understood that neither the fluid nor the catalyst initiates the reaction between the mutually reactive particle cores 9, 11.

Example Material Set I—pH Switched Outer Coating

This system includes an outer coating 13 having one of an acidic or a basic functional group. The fluid 26 (fluid 26 application is described further in connection with FIG. 4B) includes the other of the basic or the acidic functional group. A reaction between the acidic functional group and the basic functional group dissolves the coating 13 due to the fluid-induced pH switch. Because of the acid/base functionality, the center 9, 11 and outer coating 13 are selected to be compatible (i.e., non-reactive with each other).

An example of this system includes the first reactive particles 9 having acetoacetylated reactive groups, and the second reactive particles 11 having reactive vinyl groups. It is to be understood that in any examples of particles 9, 11 throughout the present disclosure, the example materials may be switched. For example, the second reactive particles 11 may have the acetoacetylated reactive groups, and the first reactive particles 9 may have the reactive vinyl groups. In an example, the coating 13 includes carboxylic acid functional groups. Some examples include acetic acid, formic acid, etc. In another example, the coating 13 includes a combination of carboxylic acid functional groups and sulfonic acid groups. The fluid 26 is basic, which provides an alkaline environment in which the reactive particles 9, 11 can react, and which also rapidly dissolves the outer coating 13. The dissolution enables the first reactive particles 9 having acetoacetylated reactive groups and the second reactive particles 11 having reactive vinyl groups to react in the alkaline environment.

An acetoacetylated reactive group is shown below:

A reactive vinyl group is shown below:

The reaction between $R^1$ and $R^2$ occurs under a basic condition. $R^1$ can be any group except H and OH. In an example, $R^1$ is a polymeric group. Examples of $R^1$ include an acrylic or poly acrylic (e.g., $CH_3—(CH_2—CH_2)_x—C=O$). An example of the vinyl group is trimethylolpropane triacrylate (where two of the three vinyl groups are part of $R^2$).

Other examples of outer coating 13 materials for this Material Set I system include polyacrylic Acid (PAA) (includes COOH group), polysaccharides (e.g., Dextran—includes OH group), polymethacrylic acid, polyvinyl acetate (PVAc) (includes PVOH groups), hydroxypropyl methylcellulose (HPMC) (pH switchable), and polyphosphates.

Example Material Set II—Water-soluble Organic Non-Reactive Outer Coatings

This system includes an outer coating 13 that is a water-soluble, organic, and non-reactive material. The fluid 26 is aqueous (acidic, basic or neutral), and the aqueous fluid dissolves the water-soluble coating 13.

An example of this system includes the first reactive particles 9 having epoxy or isocyanate reactive groups, and the second reactive particles 11 having reactive polyfunctional amine or imine groups or polyol groups. In specific examples, the first reactive particles 9 include isocyanate groups and the second reactive particles 11 include polyol groups, or the first reactive particles 9 include isocyanate groups and the second reactive particles 11 include polyamine groups, or the first reactive particles 9 include polyfunctional epoxy groups and the second reactive particles 11 include polyfunctional amine or imine groups. The coating 13 is selected from the group consisting of polyacrylamide (PAM) and polyvinyl pyrrolidone (PVP). The fluid is aqueous and dissolves the outer coating 13.

Example Material Set III—Surfactant Outer Coating

This system includes an outer coating 13 formed from a water-soluble surfactant. The fluid 26 is aqueous (acidic, basic or neutral), and the aqueous fluid 26 dissolves the water-soluble surfactant coating 13.

Although the surfactant in the coating 13 is water soluble (and this feature is used to activate the system, e.g., when adding aqueous ink to the coating 13), it is also a hydrocarbon and polar solvent-soluble. The latter features are suitable for the encapsulation step because contact between the reactive core particles 9, 11 and water during encapsulation may not be desirable. Using a hydrocarbon surfactant to form the coating 13 keeps water from contacting the particle cores 9, 11 during encapsulation.

These water-soluble surfactant outer coatings 13 may be compatible with a wide variety of core 9, 11/outer coating 13 combinations. Some examples of suitable mutually reactive cores 9, 11 for use with these coatings include: two-part epoxies; and diisocyanates/polyols.

An example of this system includes first reactive particles 9 having reactive groups selected from the group consisting of aromatic diisocyantes, methylene diphenyl diisocyanates (MDIs), and combinations thereof, and the second reactive particles 11 having reactive polyol groups (e.g., polyethylene glycol, polypropylene glycol, or polybutylene glycol. The coating 13 is formed from a non-hydroxy-terminated surfactant, such as alkyl sulfates or alkyl sulfonates. Some examples include dihexyl sodium sulfosuccinate or dioctyl sodium sulfosuccinate (commercially available under the tradename AEROSOL OT from Cytec Industries Inc., Woodland Park, N.J.). The fluid 26 is aqueous and rapidly dissolves the coating 13.

When epoxides and diisocyanates are chosen as the reactive particles 9, 11, OH-terminated surfactants are generally not desirable as an outer coating 13 in direct contact with particles 9, 11 since OH-terminated surfactants will react with epoxides and diisocyanates. However, OH-terminated surfactants may be used as an outer coating 13 in such a case if there is an intermediate coating 13' (for example, formed from silica), initially separating the OH-terminated surfactant from the reactive epoxides or diisocyanates core particle. (See "Example Material Set V" below.)

Some methylene diphenyl diisocyanates (MDIs) are shown below:

An example polymeric MDI suitable for use in the present disclosure is commercially available under the tradename Mondur® MR-Light (from Bayer MaterialScience LLC, Pittsburgh, Pa.). Mondur® MR-Light is an aromatic polymeric isocyanate based on diphenylmethane-diisocyanate (MDI).

An example for coating any of the MDIs shown above is as follows. The MDI is emulsified in 30 wt % of n-hexane in the presence of 2 wt % of dioctyl sodium sulfosuccinate (e.g., AEROSOL OT):

dioctyl sodium sulfosuccinate

The emulsification is continued until a particle size of about 50 microns is obtained. The solution is subjected to spray drying at about 70° C. This process results in about 50 micron particle size MDI surrounded by a thin (e.g., having a thickness ranging from about 5% to about 10% of the particle size or diameter), viscous outer coating of dioctyl sodium sulfosuccinate to form first reactive particles 9 with coating 13. Dioctyl sodium sulfosuccinate is soluble both in hydrocarbons and in water.

The mutually reactive particle (i.e., second reactive particle 11) may be polyethylene glycol (PEG) having a high molecular weight so as to be a solid at room temperature. In an example, the high molecular weight is a weight average molecular weight ranging from about 1000 to about 3000. The PEG may or may not be encapsulated with the surfactant.

After coating 13 is dissolved from reactive particles 9 (and off reactive particles 11 if they are coated), the MDI and PEG come in contact and react to form a solid polyurethane material.

Surfactants are molecules having a hydrophobic part and a hydrophilic part. They may be soluble in oil, water and intermediate polarity solvents. The polar group may be fully ionic (such as in alkylsulfates or in quaternary ammonium salts), or zwitterionic (such as in betaines of phospholipids). Fully ionic groups are expected not to chemically react with epoxides or isocyanates.

At high concentration in solution, surfactants tend to form very viscous gel-like phases, such as cubic, hexagonal or lamellar phases. If surfactant solutions are put around a reactive particle and dried, e.g., by spray-drying, the coating will encapsulate the particle. Upon contact with, e.g., water, the surfactant outer coating will re-dissolve and will enable the contact between the reagents. Since both isocyanates and epoxides will react with water in the fluid, the water should dissolve the outer coating 13 and then quickly evaporate, before it chemically reacts with reactive particles 9, 11.

Example Material Set IV—Inorganic Non-Reactive Outer Coating

This system includes an outer coating 13 formed from a non-reactive inorganic material. The fluid 26 is aqueous and basic, and the aqueous fluid 26 dissolves the inorganic coating 13.

Inorganic non-reactive outer coatings 13 may be compatible with a wide variety of core 9, 11/outer coating 13 combinations. Some examples of suitable mutually reactive cores 9, 11 for use with these coatings 13 include: two-part epoxies; and diisocyanates/polyols.

An example of this system includes first reactive particles 9 having reactive groups selected from the group consisting of aromatic diisocyantes, methylene diphenyl diisocyanates (MDIs), and combinations thereof, and the second reactive particles 11 having reactive polyol groups (examples of which are provided above). The coating 13 is formed from an inorganic material, such as silica. The fluid 26 is basic and aqueous and rapidly dissolves the coating 13.

Example Material Set V—Multi-Layer Outer Coatings

This system includes an intermediate/inner coating 13' formed from a non-reactive inorganic material, and an outer coating 13 surrounding the inner coating 13'. The outer coating 13 may be a water-soluble organic material, a pH switchable material, or a water-soluble surfactant material (examples of each of which are mentioned above). The fluid 26 is aqueous, and the aqueous fluid 26 dissolves the organic water-soluble outer coating 13 and the inorganic coating 13'.

As mentioned above, inorganic non-reactive materials may be compatible with a wide variety of cores 9, 11. Some examples of suitable mutually reactive cores 9, 11 for use with these coatings 13' include: two-part epoxies; and diisocyanates/polyols. A multi-layer outer coating 13', 13 may enable the use of a wider range of core 9, 11 materials (isolated by coating 13') while taking advantage of outer coating 13 materials that rapidly dissolve.

An example of this system includes first reactive particles 9 having reactive groups selected from the group consisting of aromatic diisocyantes, methylene diphenyl diisocyanates (MDIs), and combinations thereof, and the second reactive particles 11 having reactive polyol groups. The coating 13' is very thin and is formed from an inorganic material, such as silica. The outer coating 13 is thicker than inner coating 13', and includes acidic functional groups. The total thickness of the coating 13' and the outer coating 13 ranges from about 5% to about 10% of the particle size or diameter of the particle core 9, 11 on which the coatings 13, 13' are applied. The fluid 26 is basic and aqueous. A reaction between the acidic functional groups of coating 13 and the aqueous basic fluid 26 dissolves coating 13. The aqueous basic fluid 26 then rapidly dissolves the inorganic coating 13'.

In addition to substantially preventing the outer coating 13 material from initially contacting the centers 9, 11, the addition of the second coating 13 over coating 13' may improve coating integrity by covering any potential defects in the inner coating 13'.

In an example, the build material 12 is made up of the mutually reactive particles 9, 11 (with either or both particles 9, 11 having coating(s) 13 (13') attached thereto), and no other components. In another example, the build material 12 is made up of the mutually reactive particles 9, 11 (with either or both particles 9, 11 having coating(s) 13 (13') attached thereto), as well as charge agent(s) and/or flow aid(s).

The amount of material forming coating 13, 13' present in the build material 12 depends upon the amount of mutually reactive particles 9, 11 present in the build material 12. The amount of material forming coating 13, 13' will be enough to render the thickness of the coating 13, 13' such that it ranges from about 5% to about 10% of the particle size or diameter of the underlying reactive particle core 9, 11. In an example, the material forming coating 13, 13' may be present in an amount ranging from about 0.1 wt % to about 10 wt % of a total weight percent of the mutually reactive particles 9, 11 in the build material 12. In another example, the material forming coating 13, 13' may be present in an amount ranging from about 1 wt % to about 5 wt % of the total weight percent of the mutually reactive particles 9, 11 in the build material 12. It is to be understood that the mutually reactive particles 9, 11 (and charge agent(s) and/or flow aid(s), if included) make up the remaining weight percent of the build material 12.

Spherical mutually reactive particles 9, 11 have a diameter (i.e., particle size, and not including coating 13 or 13') ranging from about 20 µm to about 100 µm, while non-spherical mutually reactive particles 9, 11 (not including coating 13 or 13') have an average diameter (i.e., the average of multiple dimensions across the particles 9, 11) ranging from about 20 µm to about 100 µm. For a non-spherical particle 9, 11, the diameter may refer to an effective diameter, which is the diameter of a sphere with the same mass and density as the non-spherical particle 9, 11.

The coating 13, 13' may be applied to the reactive particles 9, 11 using any suitable technique. Some examples include emulsion polymerization (micro or mini), polymer dispersion, polymer precipitation, spray drying, spray coating, or Wurster coating.

In an example, an emulsion or dispersion polymerization is performed to form the coating 13 on the reactive particles 9, 11 (not mixed together, as the particles would react upon contact—as such, particles 9 are coated separately from particles 11). In this example, the reactive particles 9 or 11 and a polymer precursor (e.g., monomers) are mixed together with a hydrophobe (such as hexadecane or hexadecanol). An oil-soluble free radical initiator may also be added in an amount ranging from about 0.3 wt % to about 1 wt % of the total wt % of the monomers used. This mixture is dispersed in water by adding a suitable surfactant in an amount ranging from about 0.3 wt % to about 3 wt % of the total wt % of the monomers used. The dispersion is subjected to a heat treatment (e.g., at about 50° C. to 95° C.), which causes polymerization to take place. During the polymerization, the formed polymer coating 13 wraps around the reactive particles 9 or 11. The thickness of the coating 13 may be adjusted by controlling the amount of monomer that is used. This forms the coating 13 on each particle 9 or 11. The coated particles 9, 11 are separated from the liquid component(s) using any suitable separation techniques.

The previously described emulsion or dispersion polymerization process can be carried out in solvents, such as alcohols or hydrocarbon fluids, without using the hydrophobe. In this example, as the monomers start polymerizing, the solubility of the polymer is decreased in the solvent as the polymer chain length is increased. The polymer coating 13 reaches a critical solubility and then phase separates from the media and forms a separate phase. Because of the presence of the reactive particles 9 or 11 in the medium, the precipitated polymer 13 wraps around the surface of the particles 9 or 11. In order to increase the chain length of the polymer 13 (which also increases the molecular weight), a polymer stabilizer, such as polyvinylpyrrolidone, may be added. After the polymerization, both the solvent and polymer stabilizer are removed.

In any of the examples disclosed herein, if the coating 13 material and the reactive particles 9, 11 have different surface properties that can lead to poor attachment of the coating 13 material, the particle 9, 11 may be pre-treated with a primer polymer. This primer polymer has a lower $T_g$ than the coating 13 material (for example, the primer polymer may have a $T_g$ as low as −40° C.). The primer polymer adjusts the surface properties of the particle 9, 11 so that the coating 13 material is able to adhere/attach better. When the primer polymer is used, the amount may be about 5 wt % of the total wt % of the reactive particles 9, 11.

The build material 12 disclosed herein is generally in powder form, and is made up of a plurality of mutually reactive particles 9, 11 (with particles 9 and/or 11 including coating 13 (or 13' and 13)). The shape of the particles making up the build material 12 may be the same or different. The coating 13 (or 13 and 13') does not significantly alter the shape of the underlying particle 9, 11, and thus the build material 12 maintains a similar shape to that of the underlying particles 9, 11. In an example, the build material 12 particles 9, 11 have spherical or near-spherical shapes. Build material 12 particles that have a sphericity of >0.84 are considered herein to be spherical or near-spherical. Thus, any build material 12 particles having a sphericity of <0.84 are non-spherical.

The build material 12 may be made up of similarly sized particles 9, 11 (as shown in FIG. 2) or differently sized particles. In an example, the build material 12 includes multi-modal particles of two or more different sizes. In an example that includes multi-modal particles, the average size of the first particle is larger than the average size of the second particle, and if more particles are included, the average size of the second particle may be larger than the average size of the third particle, etc. The term "size", as used herein with reference to the build material 12, refers to the diameter of a spherical particle 9, 11, or the average diameter of a non-spherical particle 9, 11 (i.e., the average of multiple dimensions across the non-spherical particle) plus the thickness of the coating 13 (or coating 13' and 13). As mentioned above, the term "size" when referring to a non-spherical particle 9, 11 of the build material 12 may be the effective diameter (i.e., the diameter of a sphere with the same mass and density as the non-spherical particle 9, 11).

The shape and size of the build material 12 particles 9, 11 allow for cubic packing and/or hexagonal packing of the build material 12. The mono-, bi-, tri-, etc. modal particle size distribution described herein may affect how the build material 12 can be packed when applied, e.g., to a fabrication bed. While the coating 13 on the reactive particles 9 and/or 11 increases the packing density, it is to be understood that the packing density may be further increased when a multi-modal particle size distribution is used. The smaller particles can fill in air voids between larger particles. In an example, the packing density may range from about 0.35 g/cm$^3$ to about 0.65 g/cm$^3$. In some examples, the packing density of the layer including the build material 12 may be greater than 0.8 g/cm$^3$ (e.g., about 0.9 g/cm$^3$).

It is to be understood that build material 12 may also include (in addition to mutually reactive but isolated particles 9, 11) a charging agent, a flow aid, or combinations thereof. These components may be added during the coating process.

Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 12 particles.

Flow aid(s) may be added to improve the coating flowability of the build material 12. Flow aid(s) may be particularly desirable when the build material 12 particles are less than 25 µm in size. The flow aid improves the flowability of the build material 12 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), titanium dioxide, zinc oxide, or polydimethylsiloxane (E900). In an example, the flow aid is added in an amount ranging from greater than 0 wt % to less than 5 wt % based upon the total wt % of the build material 12 particles.

A three-dimensional object printing kit includes the storage-stable (due to the mutually reactive particles 9, 11 being isolated from each other until application of the fluid 26) build material 12; and the fluid 26 to disrupt the coating upon application to the build material 12 so as to allow the first 9 and second 11 reactive particles to contact each other, react and fuse.

Referring now to FIG. 4A, the printing system 10 for forming the 3D object includes a supply bed 16 (including a supply of the build material 12), a delivery piston 18, a roller 20, a fabrication bed 22 (having a contact surface 23), and a fabrication piston 24. Each of these physical elements may be operatively connected to a central processing unit (CPU) of the printing system 10. The central processing unit (e.g., running computer readable instructions stored on a non-transitory, tangible computer readable storage medium) manipulates and transforms data represented as physical (electronic) quantities within the printer's registers and memories in order to control the physical elements to create the 3D object. The data for the selective delivery of the build material 12, the fluid 26, etc. may be derived from a model of the 3D object to be formed.

The delivery piston 18 and the fabrication piston 24 may be the same type of piston, but are programmed to move in opposite directions. In an example, when a first layer of the 3D object is to be formed, the delivery piston 18 may be programmed to push a predetermined amount of the build material 12 out of the opening in the supply bed 16, and the fabrication piston 24 may be programmed to move in the opposite direction of the delivery piston 18 in order to increase the depth of the fabrication bed 22. The delivery piston 18 will advance enough so that when the roller 20 pushes the build material 12 into the fabrication bed 22 and onto the contact surface 23, the depth of the fabrication bed 22 is sufficient so that a layer 14 of the build material 12 may be formed in the bed 22. The roller 20 is capable of spreading the build material 12 into the fabrication bed 22 to form the layer 14, which is relatively uniform in thickness (as shown at reference number 102 in FIG. 1 and in FIG. 4A). In an example, the thickness of the layer 14 ranges from about 90 μm to about 110 μm, although thinner or thicker layers may also be used. As mentioned above, the build material 12 includes a plurality of first reactive particles 9; a plurality of second reactive particles 11, the first 9 and second 11 reactive particles to react with each other upon contact therewith; and a coating 13 (or 13' and 13) on the plurality of first reactive particles 9 and/or on the plurality of second reactive particles 11. The coating 13 (or 13' and 13) is to isolate the plurality of first reactive particles 9 from the plurality of second reactive particles 11.

It is to be understood that the roller 20 may be replaced by other tools, such as a blade that may be desirable for spreading different types of powders, or a combination of a roller and a blade. When applying the build material 12, a transversal speed of 0.1 inches per second to 100 inches per second may be used.

After the layer 14 of the build material 12 is introduced into the fabrication bed 22, the layer 14 may be exposed to pre-heating if desired. The heating temperature (if used) may vary, as long as the coating 13, 13' maintains its structural integrity (i.e., does not melt) at the heating temperature. As such, the heating temperature selected depends, at least in part, on the coating 13, 13' material that is used in the build material 12. The heating temperature may or may not be below the melting temperature of the mutually reactive particle cores 9, 11. As examples, the heating temperature may be up to 5° C. below the melting point of the coating 13, 13' in the build material 12 if the coating 13, 13' is a crystallized or semi-crystallized material. In an example in which the coating 13, 13' material in the build material 12 is a PA 12 polymer having a melting point ranging from about 165° C. to about 185° C., the pre-heating temperature can be up to 160° C.

Pre-heating the layer 14 of the build material 12 may be accomplished using any suitable heat source that exposes all of the build material 12 in the fabrication bed 22 to the heat. Examples of the heat source include an electromagnetic radiation source, such as an infrared (IR) light source or near-infrared light source. Pre-heating may be used to ensure that the build material 12 is at a uniform temperature, which may help with improving cycle time.

After pre-heating the layer 14 (or directly after application of the layer 14 in the fabrication bed 22 if pre-heating is not done), the fluid 26 is selectively applied on a portion of the build material 12 in the layer 14. The fluid 26 disrupts/dissolves the coating 13, 13' on the portion 30 of the build material 12 such that the first 9 and second 11 reactive particles in the portion 30 of the build material 12 contact each other, react and fuse, as shown at reference number 104 in FIG. 1 and in FIG. 4B.

Figure 4B:
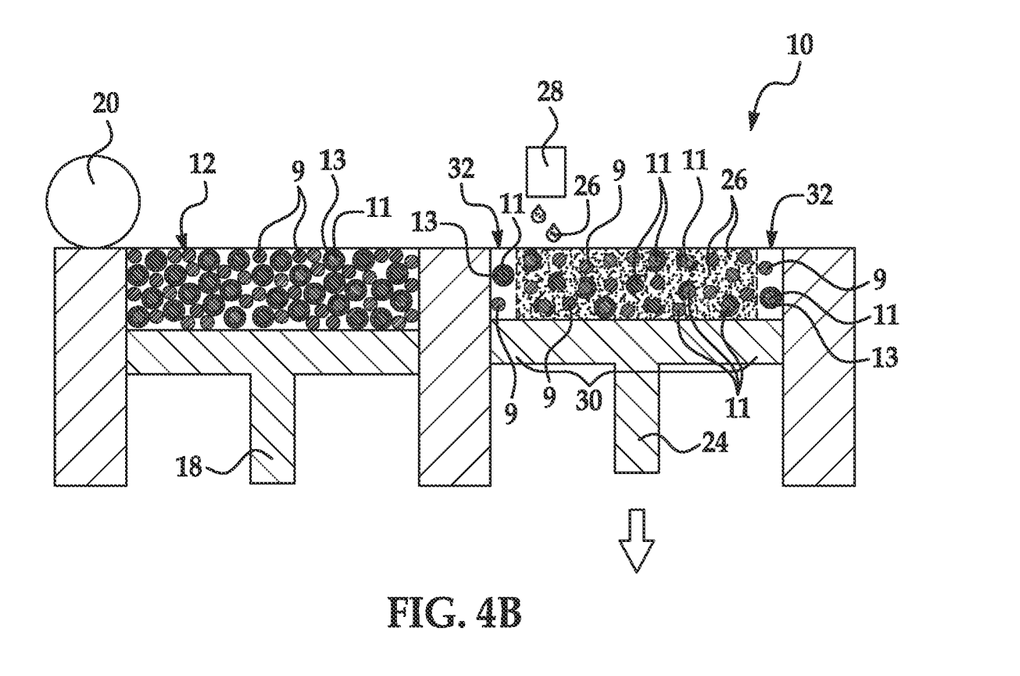
Figure 4C:
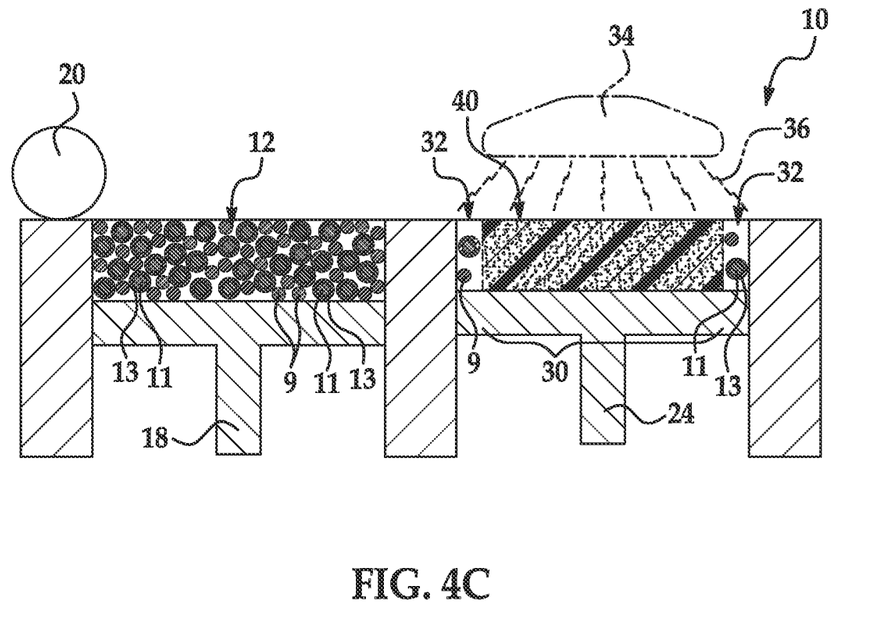
Figure 5:
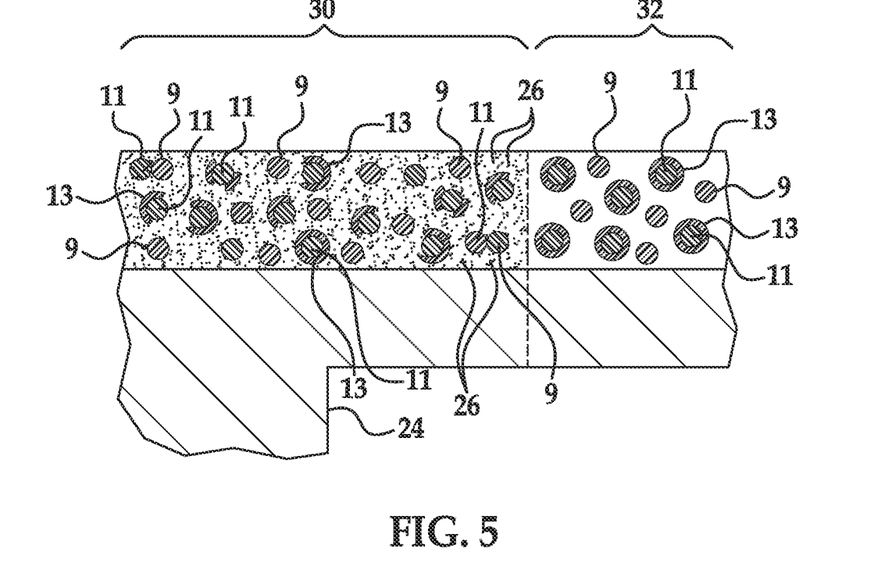
FIG. 5 is an enlarged, semi-schematic, cut-away cross-sectional view of a portion of FIG. 4B.

FIG. 5 is a semi-schematic, cut-away cross-sectional view of a portion of FIG. 4B. This view is enlarged in order to illustratively represent the effect of the fluid 26 upon the mutually reactive particles 9, 11. As can be seen in area 30 (which has had fluid 26 selectively applied thereto), the fluid 26 is acting upon coatings 13 to disrupt/dissolve the coatings. In some examples, the fluid 26 may not be incorporated in its entirety into the build material 12. In these examples, water in the fluid 26 is evaporated (e.g., by exposing the materials to a drying process, described below in reference to FIG. 4C), and the solvent or the pH activation will dissolve the coating 13. As mentioned above, a catalyst in the fluid 26 may also accelerate the reaction between the mutually reactive particle cores 9, 11 after the coating 13 is removed. In FIG. 4B, some coatings 13 are shown still on particles 11, in various degrees of removal from particles 11, and totally removed from particles 11. Some uncoated (i.e., no longer isolated one from the other) mutually reactive particles 9, 11 are shown joined together to represent initiation of the chemical reaction therebetween to result in fusing/bonding/hardening of the particles.

In the area 32, the coatings 13 remain on particles 11, and the mutually reactive particles remain isolated from each other.

As illustrated in FIG. 4B, the fluid 26 may be dispensed from an inkjet applicator 28 (e.g., a thermal inkjet printhead or a piezoelectric inkjet printhead). While a single inkjet applicator 28 is shown in FIG. 4B, it is to be understood that multiple inkjet applicators may be used that span the width of the fabrication bed 22. The inkjet applicator(s) 28 may be attached to a moving XY stage or a translational carriage (neither of which is shown) that moves the inkjet applicator (s) 28 adjacent to the fabrication bed 22 in order to deposit the fluid 26 in desirable area(s).

The inkjet applicator(s) 28 may be programmed to receive commands from the central processing unit and to deposit the fluid 26 according to a pattern of a cross-section for the layer of the 3D object that is to be formed. As used herein, the cross-section of the layer of the 3D object to be formed refers to the cross-section that is parallel to the contact surface 23. The inkjet applicator(s) 28 selectively applies the fluid 26 on those portions of the layer 14 that are to be fused to become one layer of the 3D object. As an example, if the first layer is to be shaped like a cube or cylinder, fluid 26 will be deposited in a square pattern or a circular pattern (from a top view), respectively, on at least a portion of the layer 14 of the build material 12. In the example shown in FIG. 4B, the fluid 26 is deposited in a square pattern on the area or portion 30 of the layer 14, and not on the areas or portions 32.

The fluid 26 used in the examples disclosed herein is aqueous based. The aqueous nature and particular components of the fluid 26 enhance the wetting properties of the fluid 26, even on the build material 12, which may be hydrophobic in some examples. This enables the fluid 26 to be printed more uniformly over the build material 12 surface.

While a single fluid 26 is shown in FIG. 4B, a plurality of fluids may be used. For example different fluids with different functions may be used. As an example, a fluid 26 may be used to provide color, another fluid 26 may be used to dissolve the coating 13 and, in some instances, provide the catalyst, and yet another fluid 26 may be used to incorporate a binder for fusing enhancement.

The fluid 26 may be a colored (e.g., CMYKW) inkjet ink, or a colorless (without any dye/pigment) inkjet ink. It is to be understood that the inks used as the fluid 26 will include components appropriate to disrupt/dissolve the respective coating 13/13', 13, as mentioned above. For example, if coating 13 is a pH switchable coating, the pH of the inkjet ink is tailored to disrupt/dissolve the pH switchable outer coating 13. Table 1 provides examples of the colored fluid 26. It to be understood that the composition of the fluid 26 may be altered in order to disrupt/dissolve the coating 13 while not dissolving the particle cores 9, 11.

TABLE 1

Example Colored Fluids

|  | Black (K) | Cyan | Magenta | Yellow |
|---|---|---|---|---|
| Colorant |  |  |  |  |
| K pigment dispersion from DIC Corp. | 2.50 |  |  |  |
| Cyan pigment dispersion from DIC Corp. |  | 2.25 |  |  |
| Magenta pigment dispersion from DIC Corp. |  |  | 3.50 |  |

TABLE 1-continued

Example Colored Fluids

|  | Black (K) | Cyan | Magenta | Yellow |
|---|---|---|---|---|
| Yellow pigment dispersion from DIC Corp. |  |  |  | 4.00 |
| Vehicle |  |  |  |  |
| Co-solvents |  |  |  |  |
| 2-Pyrrolidinone | 15.00 | 15.00 | 15.00 | 15.00 |
| 2-Hydroxyethyl-2-Pyrollidinone | 5.00 | 5.00 | 5.00 | 5.00 |
| Surfactants |  |  |  |  |
| Surfynol ® SEF | 0.85 | 0.65 | 0.65 | 0.65 |
| Additives |  |  |  |  |
| Crodafos ® O3A | 0.50 | 1.00 | 0.75 | 0.75 |
| Biocide |  |  |  |  |
| Proxel GXL (as is) | 0.18 | 0.18 | 0.18 | 0.18 |
| Kordek MLX | 0.14 | 0.14 | 0.14 | 0.14 |
| Water | balance | balance | balance | balance |
| pH (adjusted with KOH) | 9.2 to 9.4 | 9.2 to 9.4 | 9.2 to 9.4 | 9.2 to 9.4 |

In some examples, the inkjet printhead(s)/applicator(s) 28 are capable of separately dispensing CMYKW (cyan, magenta, yellow, black, and white) inks. A printhead/applicator 28 may also include a colorless ink.

The fluid 26 may also include additional components. For example, the fluid 26 may include a surfactant, a co-solvent, a biocide, a humectant, an anti-kogation agent, or combinations thereof.

Surfactant(s) may be used to improve the wetting properties of the fluid 26. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the fluid 26 may range from about 0.5 wt % to about 1.4 wt % based on the total wt % of the fluid 26.

The type and amount of surfactant may be selected so that a contact angle with a contact line of the build material 12 is less than 90°. In some instances, the contact angle may be less than 45°, which may be desirable to ensure wetting of the build material 12 with the fluid 26.

A co-solvent may be included in the fluid 26 to speed evaporation of the fluid 26 after application to the build material 12. Some examples of the co-solvent include 1-(2-hydroxyethyl)-2-pyrollidinone, 2-Pyrrolidinone, 1,5-Pentanediol, Triethylene glycol, Tetraethylene glycol, 2-methyl-1,3-propanediol, 1,6-Hexanediol, Tripropylene glycol methyl ether, N-methylpyrrolidone, Ethoxylated Glycerol-1

(LEG-1), and combinations thereof. In an example, 2-Pyrrolidinone is selected as the co-solvent.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). The biocide or antimicrobial may be added in any amount ranging from about 0.05 wt % to about 0.5 wt % with respect to the total wt % of the fluid 26.

When included in the fluid 26, the humectant is present in an amount ranging from about 0.1 wt % to about 15 wt %. Examples of suitable humectants include Di-(2-hydroxyethyl)-5,5-dimethylhydantoin (e.g., DANTOCOL® DHF from Lonza, Inc.), propylene glycol, hexylene glycol, butylene glycol, glyceryl triacetate, vinyl alcohol, neoagarobiose, glycerol, sorbitol, xylitol, maltitol, polydextrose, quillaia, glycerin, 2-methyl-1,3-propanediol, and combinations thereof.

An anti-kogation agent may be included in the fluid 26. Kogation refers to the deposit of dried ink (e.g., fluid 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the fluid 26 may range from greater than 0.20 wt % to about 0.62 wt % based on the total wt % of the fluid 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.015 wt %.

The balance of the fluid 26 is water. In an example, the amount of water ranges from about 70 wt % to about 95 wt % of the total weight of the fluid 26.

As briefly mentioned above, after the fluid 26 is selectively applied in the desired area(s) or portion(s) 30, the entire layer 14 of the build material 12 and the fluid 26 applied to at least a portion thereof may be exposed to electromagnetic radiation, if desired. This is shown in phantom (at reference numerals 34 and 36) in FIG. 4C. This may be desirable to speed evaporation/drying of the fluid 26, and/or to accelerate coating 13 dissolution, and/or to accelerate reaction/fusing between particles 9, 11 after the coating 13 dissolves. However, it is to be understood that the temperature applied is not high enough to melt or sinter particles 9, 11. In these examples, the coating 13 on the unreacted particles 9, 11 (e.g., in the area where fluid is not applied) remains intact, and thus is also able to withstand the temperature applied. In addition to, or instead of using an applied heat source 34, the fabrication bed 22 (FIG. 4 series)/support member 60 (FIG. 7) may be heated (if heating is desired).

It is to be understood that the degree of reactivity between particles 9, 11 may be enhanced or diminished by the jetted fluid 26 via catalysts and accelerators.

In an example, the electromagnetic radiation 36 may be infrared or near-infrared radiation. The electromagnetic radiation 36 is emitted from a radiation source 34, such as an IR or near-IR curing lamp, IR or near-IR light emitting diodes (LED), a microwave, or lasers with the desirable electromagnetic wavelengths. In an example, the light source electromagnetic wavelengths range from about 100 nm (UV) to about 10 μm. In another example, the light source is a near-infrared light source with wavelengths of about 800 nm. In yet another example, the radiation source 34 is an infrared light source with wavelengths of about 2 μm. The radiation source 34 may be attached, for example, to a carriage that also holds the inkjet applicator(s) 28. The carriage may move the radiation source 34 into a position that is adjacent to the fabrication bed 22. The radiation source 34 may be programmed to receive commands from the central processing unit and to expose the layer 14 and applied fluid 26 to electromagnetic energy (e.g., IR or near-IR energy).

The length of time the radiation 36 is applied for, or the energy exposure time, may be dependent, for example, on one or more of: characteristics of the radiation source 34; characteristics of the build material 12; and/or characteristics of the fluid 26.

In some examples, the fluid 26 may additionally include a radiation absorbing binding agent (i.e., an active material). The active material may be any infrared light absorbing colorant. In an example, the active material is a near infrared light absorber. Any near infrared colorants produced by Fabricolor, Eastman Kodak, or Yamamoto may be used in the fluid 26. As one example, the fluid 26 may be an ink-type formulation including carbon black as the active material. Examples of this ink-type formulation are commercially known as CM997A, 516458, C18928, C93848, C93808, or the like, all of which are available from Hewlett-Packard Company. With these examples, the infrared absorbing capability of the carbon black may aid in accelerating the reaction between the mutually reactive particle cores 9, 11.

The amount of the active material (e.g., carbon black pigment) that is present in the fluid 26 may range from about 3.0 wt % to about 6.0 wt % based on the total wt % of the fluid 26. In other examples, the amount of the active material present in fluid 26 ranges from greater than 4.0 wt % up to about 6.0 wt %. It is believed that these active material/pigment loadings provide a balance between the fluid 26 having jetting reliability and electromagnetic radiation absorbance efficiency. When the active material/carbon black pigment is present in an ink-type formulation, the amount of the ink-type formulation that is added to the fluid 26 may be selected so that the amount of the active material in the fluid 26 is within the given ranges.

When the active material is included, the fluid 26 enhances the absorption of the electromagnetic energy, converts the absorbed electromagnetic radiation 36 to thermal energy, and promotes the transfer of the thermal heat to the build material 12 in contact with the fluid 26 (i.e., in the area(s)/portion(s) 30). In an example, the fluid 26 sufficiently elevates the temperature of the build material 12 in the area(s) 30 to speed evaporation/drying of the fluid 26 (but below the melting or softening point of reactive particles 9, 11).

The reaction and fusing of mutually reactive particles 9, 11 form one layer 40 of the 3D object 50 (FIGS. 4D and 6) to be formed.

If it is desired to form subsequent layers of the 3D object 50, a layer of the build material 12 may be applied on the layer 40 of the three-dimensional object 50 (as shown at reference numeral 106 in FIG. 1). Then fluid 26 is selectively applied on a portion 30 of the layer of the build material 12, the fluid disrupting the coating 13 (or 13' and 13) on the portion 30 of the layer of the build material 12 such that the first 9 and second 11 reactive particles in the portion 30 of the layer of the build material 12 contact each other, react and fuse, thereby forming another layer (e.g., layers 42, 44, 46, FIG. 4D) of the three-dimensional object 50 (as shown at reference numeral 108 in FIG. 1).

At reference numeral 110, reference numerals 106 and 108 of method 100 in FIG. 1 may be repeated as many times as desirable to create subsequent layers 42, 44, 46, etc. (FIGS. 4D and 6) and to ultimately form the 3D object 50.

It is to be understood that the subsequently formed layers 42, 44, 46 may have any desirable shape and/or thickness and may be the same as, or different from any other layer 40, 42, 44, 46, depending upon the size, shape, etc. of the 3D object 50 that is to be formed.

Figure 4D:
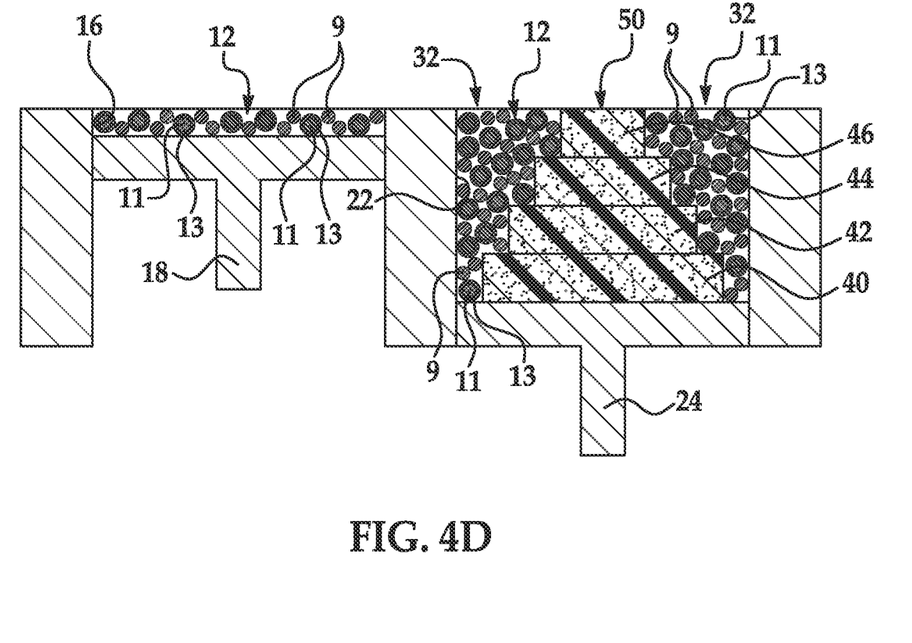
FIG. 4D is a semi-schematic, cross-sectional view of an example of the 3D object that may be formed after performing FIGS. 4A through 4C several times.

As illustrated in FIG. 4D, as subsequent layers 42, 44, 46 have been formed, the delivery piston 18 is pushed closer to the opening of the delivery bed 16, and the supply of the build material 12 in the delivery bed 16 is diminished (compared, for example, to FIG. 4A at the outset of the method 100). The fabrication piston 24 is pushed further away from the opening of the fabrication bed 22 in order to accommodate the subsequent layer(s) of build material 12 and selectively applied fluid 26. Since at least some of the build material 12 remains unfused after each layer 40, 42, 44, 46 is formed, the 3D object 50 in the fabrication bed 22 is at least partially surrounded by the non-fused build material 12.

When the 3D object 50 is formed, it may be removed from the fabrication bed 22, and exposed to a cleaning process that removes non-fused build material 12 from the 3D object 50. Some examples of the cleaning process include brushing, water-jet cleaning, sonic cleaning, blasting, and combinations thereof. The non-fused build material 12 remaining in the fabrication bed 22 may be reused depending, in part, on process conditions.

Figure 6:
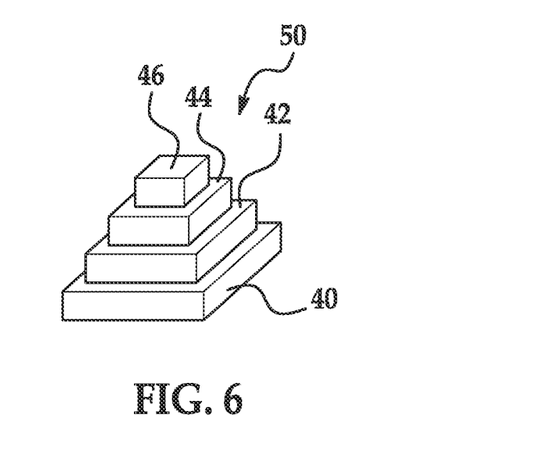
FIG. 6 is a perspective view of the 3D object of FIG. 4D.

FIG. 6 illustrates a perspective view of the 3D object 50. Each of the layers 40, 42, 44, 46 includes fused (after chemical reaction therebetween) reactive particles 9, 11.

Figure 7:
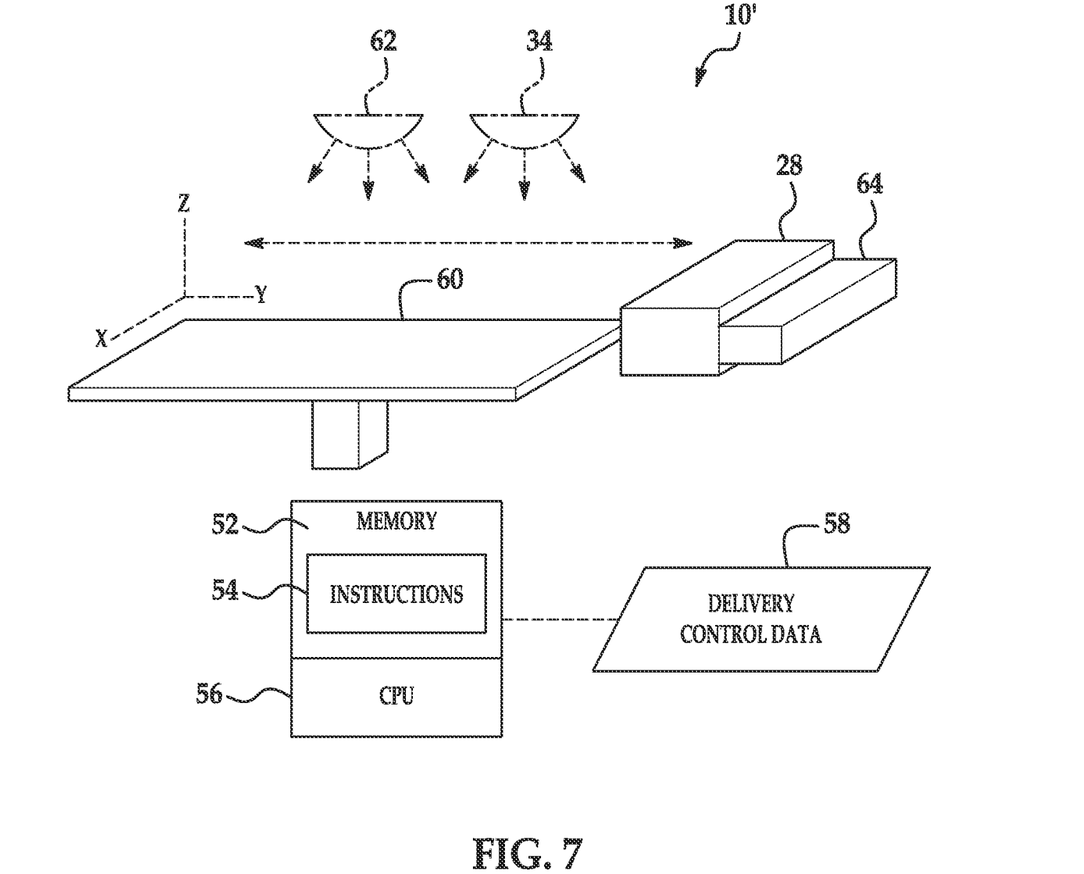
FIG. 7 is a simplified isometric view of an example of a 3D printing system that may be used in an example of the 3D printing method disclosed herein.

Referring now to FIG. 7, another example of the printing system 10' is depicted. The system 10' includes a central processing unit (CPU) 56 that controls the general operation of the additive printing system 10'. As an example, the central processing unit 56 may be a microprocessor-based controller that is coupled to a memory 52, for example via a communications bus (not shown). The memory 52 stores the computer readable instructions 54. The central processing unit 56 may execute the instructions 54, and thus may control operation of the system 10' in accordance with the instructions 54.

In this example, the printing system 10' includes the inkjet applicator 28 to selectively deliver/apply the fluid 26 to a layer 14 (not shown in this figure) of build material 12 provided on a support member 60. In an example, the support member 60 has dimensions ranging from about 10 cm by 10 cm up to about 100 cm by 100 cm, although the support member 60 may have larger or smaller dimensions depending upon the 3D object 50 that is to be formed.

The central processing unit 56 controls the selective delivery of the fluid 26 to the layer 14 of the build material 12 in accordance with delivery control data 58.

In the example shown in FIG. 7, it is to be understood that the inkjet applicator 28 is a printhead, such as a thermal printhead or a piezoelectric inkjet printhead. The inkjet applicator 28 may be a drop-on-demand printhead or a continuous drop printhead.

The inkjet applicator 28 may be used to selectively deliver the fluid 26. As described above, the fluid 26 includes an aqueous vehicle (such as water), and, in some instances, other suitable components, such as a co-solvent, a surfactant, etc., to facilitate its delivery via the inkjet applicator 28.

In one example, the inkjet applicator 28 may be selected to deliver drops of the fluid 26 at a resolution ranging from about 300 dots per inch (DPI) to about 1200 DPI. In other examples, the inkjet applicator 28 may be selected to be able to deliver drops of the fluid 26 at a higher or lower resolution.

The inkjet applicator 28 may include an array of nozzles through which the inkjet applicator 28 is able to selectively eject drops of fluid. In one example, each drop may be in the order of about 10 pico liters (pl) per drop, although it is contemplated that a higher or lower drop size may be used. In some examples, inkjet applicator 28 is able to deliver variable size drops.

The inkjet applicator 28 may be an integral part of the printing system 10', or it may be user replaceable. When the inkjet applicator 28 is user replaceable, it may be removably insertable into a suitable distributor receiver or interface module (not shown).

In another example of the printing system 10', a single inkjet printhead may be used to selectively deliver different fluids 26. For example, a first set of printhead nozzles of the printhead may be configured to deliver one of the fluids 26, and a second set of printhead nozzles of the printhead may be configured to deliver another of the fluids 26.

As shown in FIG. 7, the inkjet applicator 28 has a length that enables it to span the whole width of the support member 60 in a page-wide array configuration. In an example, the page-wide array configuration is achieved through a suitable arrangement of multiple inkjet applicators 28. In another example, the page-wide array configuration is achieved through a single inkjet applicator 28 with an array of nozzles having a length to enable them to span the width of the support member 60. In other examples of the printing system 10', the inkjet applicator 28 may have a shorter length that does not enable them to span the whole width of the support member 60.

While not shown in FIG. 7, it is to be understood that the inkjet applicator 28 may be mounted on a moveable carriage to enable it to move bi-directionally across the length of the support member 60 along the illustrated Y-axis. This enables selective delivery of the fluid 26 across the whole width and length of the support member 60 in a single pass. In other examples, the inkjet applicator 28 may be fixed while the support member 60 is configured to move relative thereto.

As used herein, the term 'width' generally denotes the shortest dimension in the plane parallel to the X and Y axes shown in FIG. 7, and the term 'length' denotes the longest dimension in this plane. However, it is to be understood that in other examples the term 'width' may be interchangeable with the term 'length'. As an example, the inkjet applicator 28 may have a length that enables it to span the whole length of the support member 60 while the moveable carriage may move bi-directionally across the width of the support member 60.

In examples in which the inkjet applicator 28 has a shorter length that does not enable them to span the whole width of the support member 60, the inkjet applicator 28 may also be movable bi-directionally across the width of the support member 60 in the illustrated X axis. This configuration enables selective delivery of the fluid 26 across the whole width and length of the support member 60 using multiple passes.

The inkjet applicator 28 may include therein a supply of the fluid 26, or may be operatively connected to a separate supply of the fluid 26.

As shown in FIG. 7, the printing system 10' also includes a build material distributor 64. This distributor 64 is used to provide the layer (e.g., layer 14) of the build material 12 on the support member 60. Suitable build material distributors 64 may include, for example, a wiper blade, a roller, or combinations thereof.

The build material 12 may be supplied to the build material distributor 64 from a hopper or other suitable delivery system. In the example shown, the build material distributor 64 moves across the length (Y axis) of the support member 60 to deposit a layer of the build material 12. As previously described, a first layer of build material 12 will be deposited on the support member 60, whereas subsequent layers of the build material 12 will be deposited on a previously deposited (and solidified) layer.

It is to be further understood that the support member 60 may also be moveable along the Z axis. In an example, the support member 60 is moved in the Z direction such that as new layers of build material 12 are deposited, a predetermined gap is maintained between the surface of the most recently formed layer and the lower surface of the inkjet applicator 28. In other examples, however, the support member 60 may be fixed along the Z axis, and the inkjet applicator 28 may be movable along the Z axis.

Similar to the system 10, the system 10' also may include the radiation source 34 (shown in phantom) to apply energy when/if desired to the deposited layer of build material 12 and the selectively applied fluid 26 to facilitate the evaporation/drying of the fluid 26. Any of the previously described radiation sources 34 may be used. In an example, the radiation source 34 is a single energy source that is able to uniformly apply energy to the applied materials, and in another example, radiation source 34 includes an array of energy sources to uniformly apply energy to the deposited materials.

In the examples disclosed herein, the radiation source 34 is configured to apply energy in a substantially uniform manner to the whole surface of the deposited build material 12. This type of radiation source 34 may be referred to as an unfocused energy source. Exposing the entire layer to energy simultaneously may help increase the speed at which a three-dimensional object 50 may be generated.

While not shown, it is to be understood that the radiation source 34 may be mounted on the moveable carriage or may be in a fixed position.

The central processing unit 56 may control the radiation source 34. The amount of energy applied may be in accordance with delivery control data 58.

The system 10' may also include a pre-heater 62 (shown in phantom) that may be used (if desired) to pre-heat the support member 60 and/or the deposited build material 12 (as described above). The use of the pre-heater 62 may help speed the evaporation/drying of the fluid 26 after application.

Still further, the system 10' may include tools and components to perform the cleaning previously described.

To further illustrate the present disclosure, an example is given herein. It is to be understood that this example is provided for illustrative purposes and is not to be construed as limiting the scope of the present disclosure.

EXAMPLE

A layer of build material, including i) first reactive particles having methylene diphenyl diisocyanate reactive groups and coated with dioctyl sodium sulfosuccinate and ii) second reactive particles having polyethylene glycol reactive groups, is applied to a fabrication bed. The layer of build material is pre-heated to 148° C. or less. An aqueous colored ink (e.g., one of the inks shown in Table 1) is used as the fluid. The aqueous colored ink is thermal inkjet printed with a 9 ng or 12 ng printhead in a pattern on the layer of build material. The aqueous colored ink rapidly dissolves the dioctyl sodium sulfosuccinate coating and the first and second reactive particles begin to react to form a polyurethane material. After the aqueous colored ink is applied, the layer of build material is exposed to heat (below the melting or softening point of reactive particles) in order to speed evaporation/drying of the aqueous colored ink and accelerate the reaction and fusing between the reactive particles. The reaction and fusing of mutually reactive particles form one polyurethane layer of a 3D object.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 1 μm to about 10 μm should be interpreted to include not only the explicitly recited limits of about 1 μm to about 10 μm, but also to include individual values, such as 2 μm, 4.5 μm, etc., and sub-ranges, such as from about 3 μm to about 8 μm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
   applying a build material, including:
      a plurality of first reactive particles;
      a plurality of second reactive particles, the first and second reactive particles to react with each other upon contact therewith; and
      a coating on:
         i) the plurality of first reactive particles; or
         ii) the plurality of second reactive particles; or
         iii) both i) and ii);
      the coating to isolate the plurality of first reactive particles from the plurality of second reactive particles; and
   selectively applying a fluid on a portion of the build material, the fluid disrupting the coating on the portion of the build material to render the first and second reactive particles in the portion of the build material in contact with each other, the contact initiating mutual reacting and fusing between the first and second reactive particles.

2. The 3D printing method as defined in claim 1 wherein the plurality of first reactive particles and the plurality of second reactive particles are insoluble in the fluid.

3. The 3D printing method as defined in claim 1 wherein:
the coating includes one of an acidic or a basic functional group;
the fluid includes an other of the basic or the acidic functional group; and
a reaction between the acidic functional group and the basic functional group dissolves the coating.

4. The 3D printing method as defined in claim 1 wherein:
the coating comprises a water-soluble non-reactive organic material;
the fluid is aqueous; and
the aqueous fluid dissolves the water-soluble coating.

5. The 3D printing method as defined in claim 1 wherein:
the coating comprises a water-soluble surfactant;
the fluid is aqueous; and
the aqueous fluid dissolves the water-soluble surfactant.

6. The 3D printing method as defined in claim 1 wherein:
the coating comprises a non-reactive inorganic material;
the fluid is aqueous and basic; and
the aqueous basic fluid dissolves the inorganic coating.

7. The 3D printing method as defined in claim 6, further comprising:
an additional coating surrounding the inorganic coating, the additional coating including an acidic functional group;
wherein a reaction between the acidic functional group and the aqueous basic fluid dissolves the additional coating.

8. The 3D printing method as defined in claim 1 wherein the fluid includes a co-solvent to accelerate evaporation of the fluid after selective application.

9. The 3D printing method as defined in claim 1 wherein the build material is applied on a contact surface, and wherein the method further comprises:
selectively applying the fluid on the portion of the build material in a pattern of a cross-section of a layer of a three-dimensional object to be formed, the cross-section being parallel to the contact surface.

10. The 3D printing method as defined in claim 1 wherein a layer of a three-dimensional object is formed after the reaction and fusion of the first and second reactive particles in the portion of the build material, and wherein the method further comprises:
a) applying a layer of the build material on the layer of the three-dimensional object; and
b) selectively applying the fluid on a portion of the layer of the build material, the fluid disrupting the coating on the portion of the layer of the build material such that the first and second reactive particles in the portion of the layer of the build material contact each other, react and fuse, thereby forming an other layer of the three-dimensional object.

11. The 3D printing method as defined in claim 10, further comprising repeating a) and b) to create subsequent layers of the three-dimensional object.

12. A three-dimensional (3D) printing system, comprising:
a supply of storage-stable build material, including:
a plurality of first reactive particles;
a plurality of second reactive particles, the first and second reactive particles to mutually react with each other upon contact therewith; and
a coating on:
i) the plurality of first reactive particles; or
ii) the plurality of second reactive particles; or
iii) both i) and ii);
the coating providing isolation between the plurality of first reactive particles and the plurality of second reactive particles, to prevent mutual reaction therebetween during storage of a mixture of the plurality of first reactive particles and the plurality of second reactive particles;
a build material distributor;
a supply of fluid;
an inkjet applicator for selectively dispensing the fluid;
a controller;
a non-transitory computer readable medium having stored thereon computer executable instructions to cause the controller to:
utilize the build material distributor to dispense a layer of the build material; and
utilize the inkjet applicator to selectively dispense the fluid onto a selected area of the layer of the build material, wherein:
the fluid disrupts the coating on the selected area of the layer of the build material to render the first and second reactive particles in the selected area in contact with each other, the contact initiating mutual reacting between the first and second reactive particles; and
the mutual reacting fuses the first and second reactive particles together over the selected area.

13. The system as defined in claim 12 wherein the plurality of first reactive particles and the plurality of second reactive particles are insoluble in the fluid.

14. The system as defined in claim 12, further comprising a heater for drying the layer of build material after the mutual reaction between the first and second reactive particles, wherein the computer readable instructions cause the controller to control an output from the heater.

15. The system as defined in claim 12 wherein the storage-stable build material is an un-agglomerated mixture of the plurality of first reactive particles, the plurality of second reactive particles, and the coating.

* * * * *